INVENTORS
ROBERT S. BRACKEN
EDWARD F. PARKELL
BY
Seidel & Gonda
ATTORNEYS

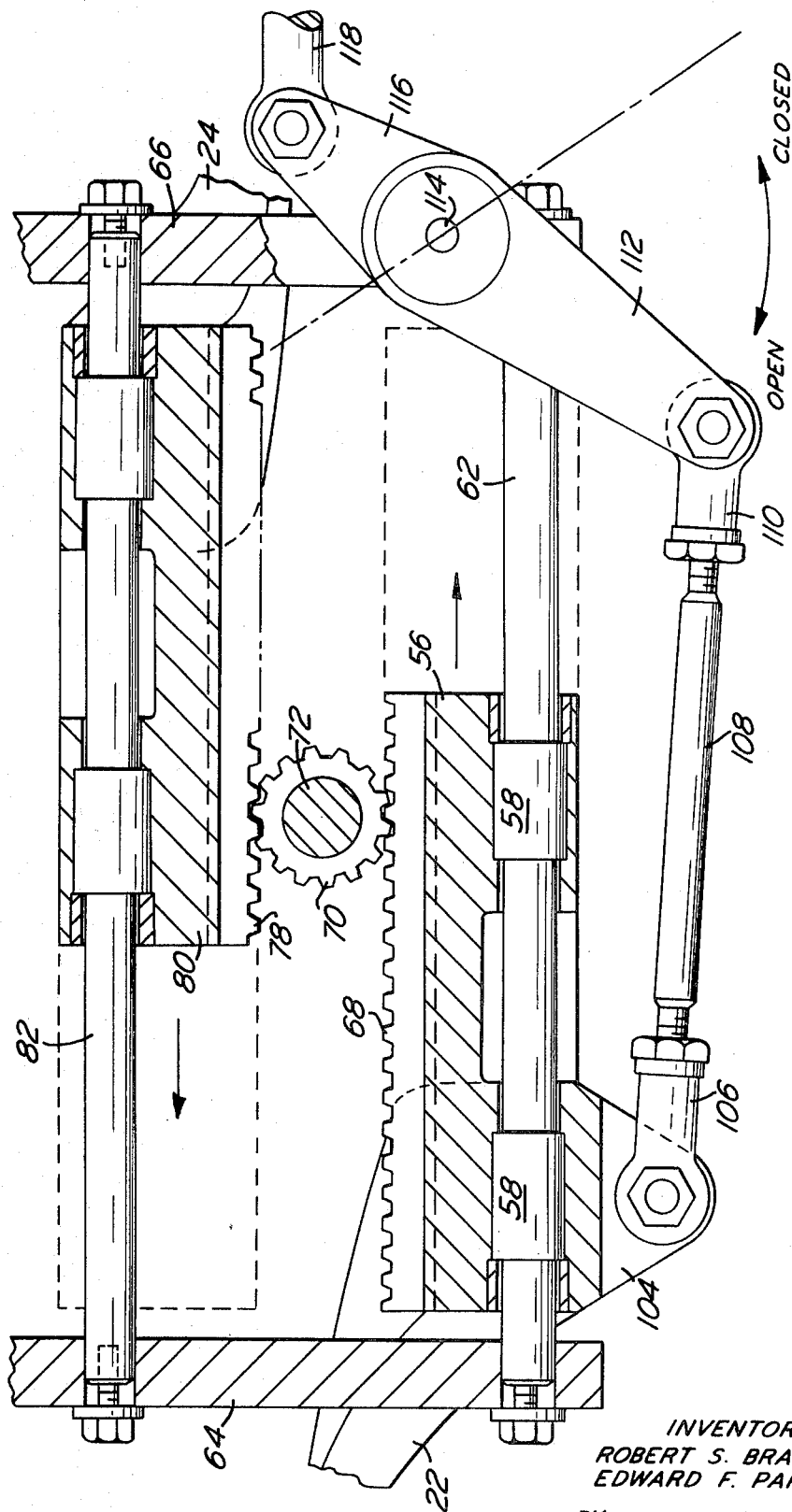

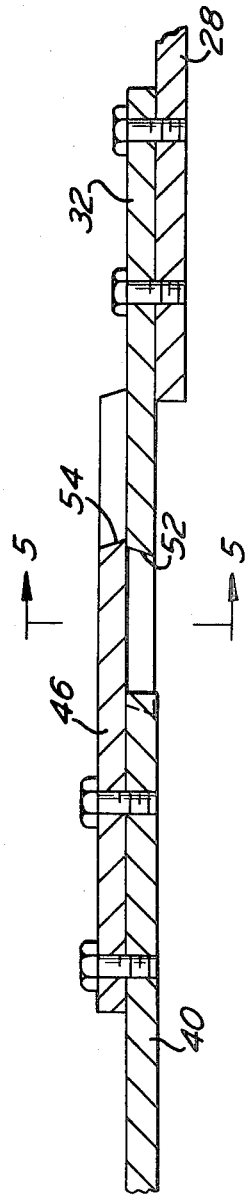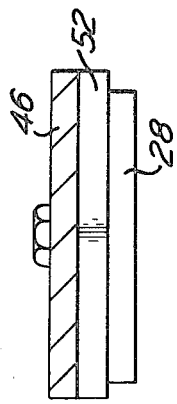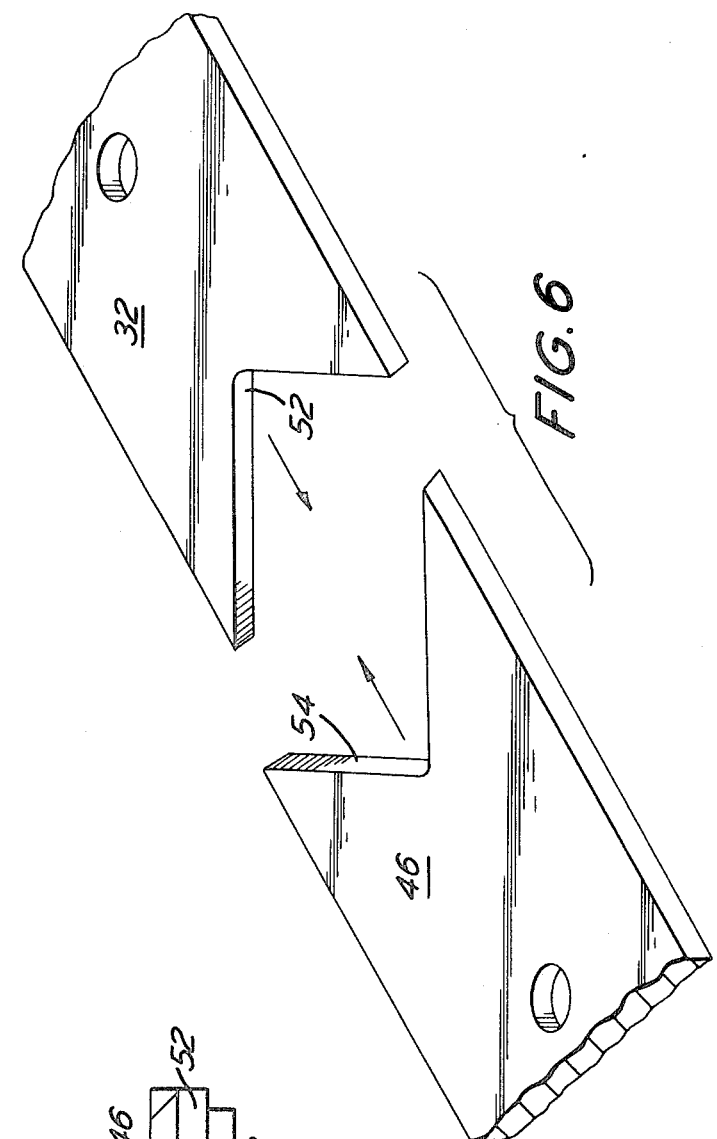

United States Patent Office 3,592,938
Patented July 13, 1971

---

3,592,938
GLASS STREAM CUTTING APPARATUS
Robert S. Bracken, Vineland, and Edward F. Parkell, Millville, N.J., assignors to Maul Bros. Inc., Millville, N.J.
Filed Apr. 29, 1968, Ser. No. 724,951
Int. Cl. C03b 5/38
U.S. Cl. 65—334
5 Claims

ABSTRACT OF THE DISCLOSURE

A triple gob glass feeder and a cooperating triple gob shear mechanism are disclosed. The shear mechanism has two arms reciprocable toward and away from each other. Each arm at its free end has three blades arranged in mating pairs to cooperate with each other for cutting three streams of glass from the feeder particularly when the streams are not aligned with one another.

---

The present invention is directed to glass handling apparatus including a triple gob glass feeder and a cooperating shear mechanism. The triple gob glass feeder discharges molten glass in three streams which are parallel to one another. The three streams may be aligned or offset so as to define the apices of a triangle.

It is believed that the triple gob shear mechanism of the present invention is the first attempt to provide such a device. Heretofore, double gob shear mechanisms have been proposed and used in the industry. For a typical example of a known type of double gob shear mechanism wherein the arms are pivotably coupled together see U.S. Patent 2,680,937. It has been determined that in order to make a triple gob shear mechanism, it is not possible to merely add a third blade to the arms of the shear mechanism disclosed in said patent.

In accordance with the present invention, in order to simultaneously shear a gob from each stream of glass, it has been ascertained that the arms of the shear mechanism must reciprocate toward and away from each other. Further, it has been ascertained that the zones of overlap on the mating blades should be positionable so as to define the apices of a triangle coincident with the center line of the streams. It is possible on small units or on units wherein the orifice ring has its center stream precooled, to have the streams in the form of a row. On larger units or where precooling is not possible or adequate for the center stream, the streams will be non-aligned.

The arms of the shear mechanism of the present invention may be reciprocated toward and away from each other in any convenient manner. Preferably, such reciprocation is accomplished by supporting the arms on a pair of parallel tracks defined by guide rods. One of the arms will be mechanically reciprocated. Said one arm is structurally interrelated with the other arm by way of a pair of racks and a pinion. Hence, one arm is reciprocated and it in turn reciprocates the other arm. In this manner, synchronization of reciprocation is materially simplified.

It is an object of the present invention to provide a novel triple gob shear mechanism juxtaposed to and for cooperation with a triple gob glass feeder.

It is another object of the present invention to provide a novel shear mechanism for simultaneously shearing gobs from three parallel streams of molten glass.

It is another object of the present invention to provide a novel shear mechanism for simultaneously shearing gobs of glass from three non-aligned streams of molten glass.

It is another object of the present invention to provide a novel shear mechanism having a pair of arms mounted for reciprocal movement toward and away from each other in a simple and economical manner which is reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 1.

FIG. 4 is a sectional view taken along the line 4—4 in FIG. 2.

FIG. 5 is a sectional view taken along the line 5—5 in FIG. 4.

FIG. 6 is a partial perspective view of mating blades as shown in FIG. 4.

Figure 1:
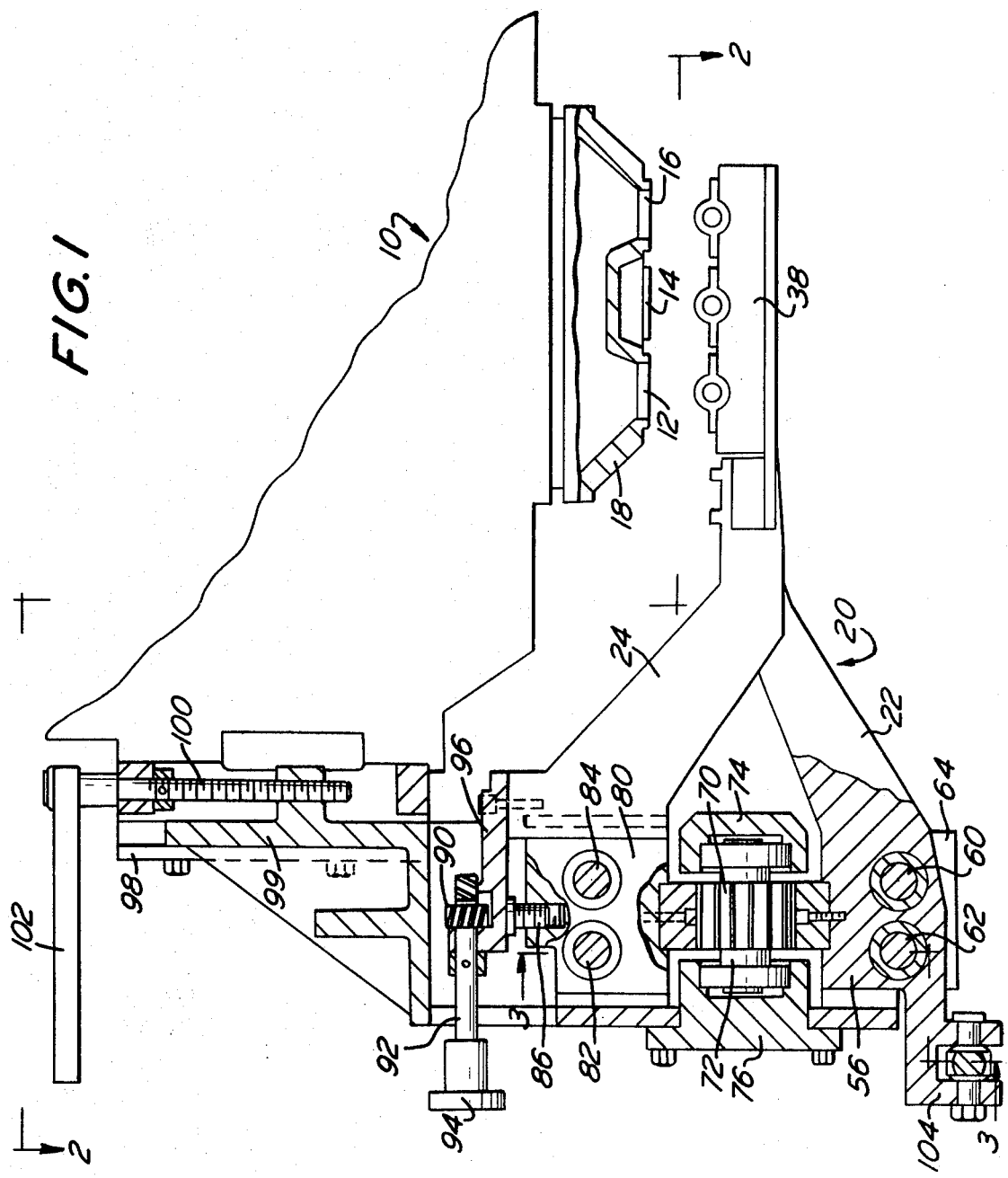
FIG. 1 is a side elevation view of the shear mechanism partly in section and supported adjacent to a glass feeder partially shown and having its orifice ring partly in section.

Referring to the drawing in detail, wherein like numerals indicate like elements there is shown in the drawings a feeder designated generally as 10 having an orifice ring. The orifice ring is designed to discharge three parallel streams of molten glass through the orifices therein and designated as 12, 14 and 16. Except for the orifice ring 18, the feeder 10 is otherwise conventional and well known to those skilled in the art.

A shear mechanism designated generally as 20 is supported by or adjacent to the feeder 10. The shear mechanism 20 has a pair of arms 22 and 24 supported at one end and free at their other ends. The free ends of the arms 22 and 24 are mounted for reciprocatory movement toward and away from each other.

Arm 22 is provided with a removable shank 26 which forms an extension of arm 22. Shank 26 is provided with a pair of spaced arms 28 and 30 which extend in the direction of movement of the arms 22 and 24 as their free ends move toward and away from each other.

A cutting blade 32 is removably and adjustably supported by arm 28. A similar cutting blade 34 is similarly supported by arm 30. A similar cutting blade 36 is similarly supported by the shank 26 intermediate the arms 28 and 30. By mounting the blade 36 directly on the shank 26, and between the arms 28 and 30, the cutting blades 32, 34 and 36 are not aligned and define a triangle.

Arm 24 is provided with a shank 38 forming an extension thereof. Shank 38 is provided with arms 40 and 42 which extend toward and are aligned with the arms 28 and 30, respectively. It will be noted that arms 40 and 42 are substantially shorter than arms 28 and 30. An arm 44 is provided on the shank 38.

Arm 44 on shank 38 is between arms 40 and 42 and is substantially longer than the latter-mentioned arm. A cutting blade 46 is removably and adjustably supported by arm 40. Blades 32 and 46 are mating blades. A blade 48 is supported on arm 42 for mating cooperation with blade 34. A blade 50 is provided on arm 44 in a similar manner for cooperation with blade 36.

As shown more clearly in FIG. 4, each of the sets of mating blades have a zone of overlap and lie in horizontal overlapping planes. Each of the blades has generally V-shaped cutting surfaces with aligned apices. As shown more clearly in FIG. 6, which is typical of the mating blades, blade 32 has a generally V-shaped cutting surface 52 and blade 46 has a generally V-shaped cutting surface 54.

The cutting surfaces 52 and 54 are generally V-shaped so that the stream of glass will be uniformly cut from all sides until the apices of the surfaces 52 and 54 reach the theoretical center of the glass stream. Since the glass stream is subject to some variation in its exact location, the apices of the surfaces 52 and 54 preferably pass beyond each other during their cutting stroke. The end of the cutting stroke and the position of the cutting surfaces 52 and 54 are shown in FIG. 4.

An actuator device is connected to the arms 22 and 24 for selectively reciprocating the same so that their free ends move toward and away from each other with a controlled repetitive operation. In this regard, the lefthand end of arm 22 is supported in a plane which is below the plane of the cutting blades as shown more clearly in FIG. 1. Likewise, the lefthand end of arm 24 is supported in a plane which is above the plane of the cutting blade. As shown more clearly in FIG. 3, the lefthand end of the arm 22 is connected to a slide 56 mounted on a track defined by a pair of horizontal guide rods 60 and 62. Suitable ball bushings 58 are provided between the guide rods and the slide 56. The free ends of the guide rods 60 and 62 are supported by the side walls 64 and 66 of a housing or frame.

A rack 68 is secured to the upper surface of slide 56 or may be made integral therewith if desired. Rack 58 meshes with pinion 70 mounted on shaft 72. Shaft 72 is supported from the housing by means of housing components 74 and 76 having roller bearings surrounding the ends of shaft 72.

Pinion 70 is in meshing engagement with a rack 78 secured to the lower surface of a slide 80. Slide 80 is connected to the lefthand end of arm 24 and is reciprocally supported by guide rods 82 and 84. The free ends of guide rods 82 and 84 are likewise supported by the walls 64 and 66. As shown more clearly in FIG. 1, the slide 56 may be integral with arm 22. Slide 84 is preferably separate from and connected to the arm 24. The slides 56 and 80 are disposed in the same vertical plane.

A mechanical means is provided for adjusting the tension between mating blades at their zone of overlap. Such means includes a threaded rod 86 coupled to the slide 80. The upper end of rod 86 is provided with a helical gear 88 in meshing engagement with a worm gear 90. Worm gear 90 is mounted on rod 92 which terminates at its lefthand end in FIG. 1 in a handle or knob 94. Shaft 92 projects through an opening in a front wall of the housing. Shaft 92 and gear 88 are supported by a plate 96 on arm 24. Since slide 80 is separate from and movable with respect to arm 24, blade tension may be adjusted by rotating handle 94. Rotation of handle 94 raises or lowers the arm 22 with respect to slide 80 and with respect to the blades on arm 22. Slide 80 and arm 24 are preferably coupled together by a keyway so as to assure vertical movement during blade tension adjustment.

The entire roof of the housing is supported from the feeder 10 for vertical adjustment of the same by means of a keyway and gibs 98. Such vertical adjustment of the entire housing and consequent raising and lowering of the cutting zone for the blades is attained by rotation of threaded shaft 100 having a handle 102. Shaft 102 is supported by the feeder 10 with a threaded connection to the roof 98.

An actuator device is connected to the slides 56 and 82 for reciprocating arms 22 and 24 toward and away from each other. A wide variety of such devices for providing the desired reciprocatory cyclic operation may be provided. Preferably, such device includes a clevis 104 secured to an extension on the slide 56. Clevis 104 is pivotably coupled to an ear 106 on tie rod 108 as shown more clearly in FIG. 3. The other end of tie rod 108 is threadedly connected to a similar ear 110.

The free end of ear 110 is pivotally connected to a clevis at one end of arm 112 on a lever. The lever is mounted for pivotable movement about pin 114. Pin 114 is supported by bearings on the wall 66. The lever includes arm 116 which terminates at its free end in a clevis pivotally coupled to one end of a rod 118.

Figure 2:
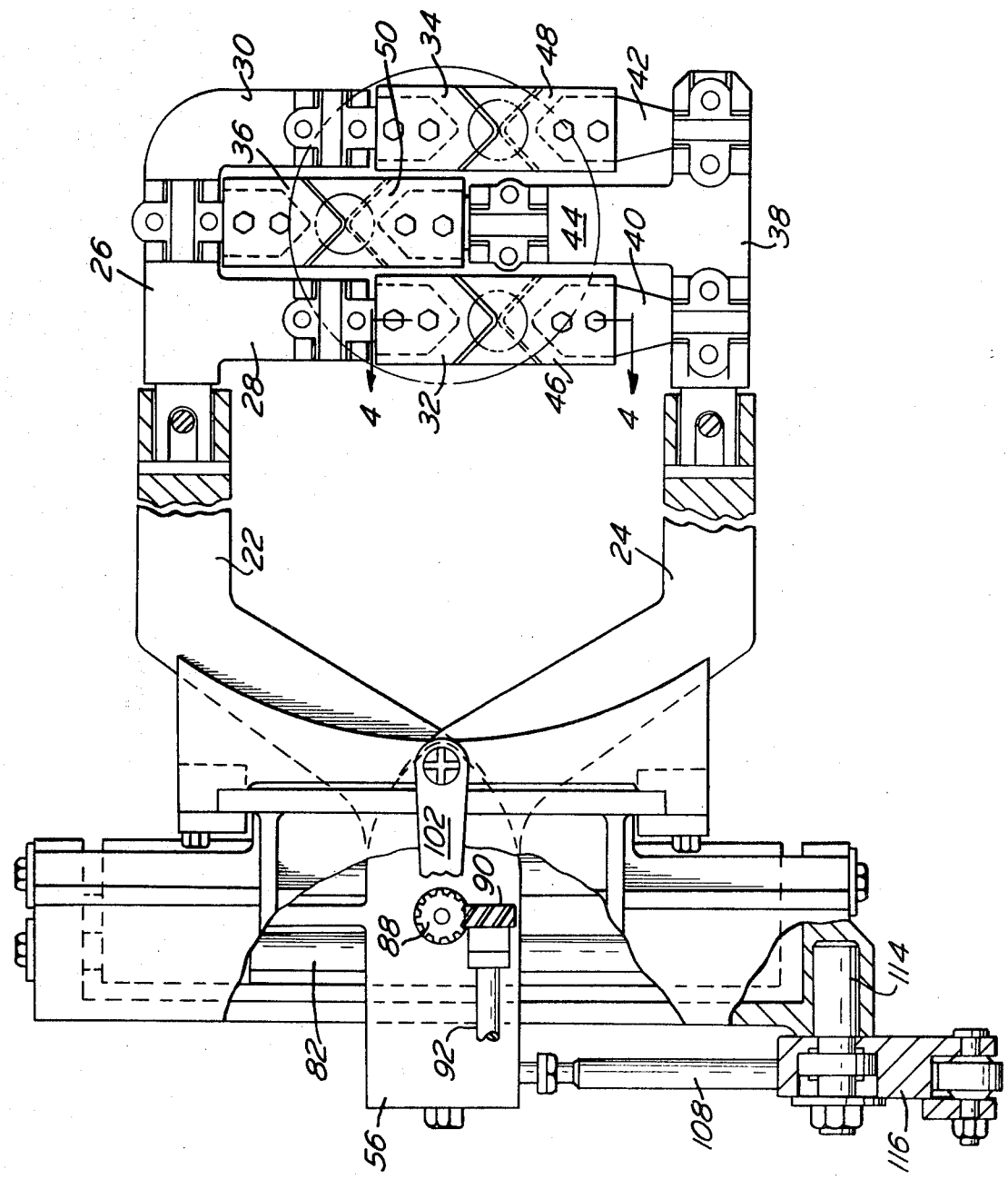
FIG. 2 is a view taken along the line 2—2 in FIG. 1.

The end of rod 118, not shown, is connected to a motor-driven cam which reciprocates the rod from the solid-line position shown in FIG. 3 to a position wherein the lever defined by arms 112 and 116 assumes the phantom position shown in FIG. 3. In the solid-line position of the arms 112 and 116, the arms of the shear mechanism are in their open position. In the phantom position of the arms 112 and 116, the arms of the shear mechanism are in their closed position. The closed position of the arms on the shear mechanism is shown in FIG. 2.

In view of the above description, a detailed explanation of operation is not deemed necessary. It will be apparent to those skilled in the art that the cyclic operation of the actuator device may be adjusted as desired so that three gobs are simultaneously cut from the streams of molten glass in timed relation to other machines such as the glass forming mechanism which will receive the gobs of glass and mold the same into bottles or containers. The artisans skilled in this art will realize that the size of the gobs as affected by the timing of the cyclic operation of the shear mechanism will be related to the size of the bottles or containers to be molded.

The present invention may be embodied in other specific forms without departing from the spirit or essential attributes thereof and, accordingly, reference should be made to the appended claims, rather than to the foregoing specification as indicated by the scope of the invention.

It is claimed:

1. Apparatus for cutting into gobs three different glass streams which form a triangle comprising a triple gob shear mechanism having first and second arms supported at one end, an actuator device connected to said one end of one of the arms for simultaneously moving the free ends of the arms toward and away from each other, the free end of each arm supporting three substantially parallel cutting blades, each cutting blade having a generally V-shaped cutting edge, means mounting each blade for overlapping cooperation with a similar mating blade on the other arm to sever a stream of glass into gobs of glass, and means mounting the mating blades on said arms so that the cutting edges form the apices of a triangle.

2. Apparatus in accordance with claim 1 including a glass feeder having an orifice ring, said orifice ring having orifices positioned to correspond with the apices of said triangle so that each stream will be cut by a set of mating blades on said arms, said arms being positioned so that their cutting blades are beneath the orifice ring, and means for raising and lowering the arms toward and away from the elevation of said orifice ring.

3. Apparatus for cutting different glass streams into gobs of glass comprising a shear mechanism having first and second arms supported at one end, an actuator device connected to said one end of the arms for moving the free ends of the arms toward and away from each other, the free end of each arm supporting a plurality of cutting blades, each cutting blade having a generally V-shaped cutting edge, means mounting the blades for overlapping cooperation with a mating blade on the other arm to sever a stream of glass into gobs, said one end of said arms being at different elevations, said actuator device including a mechanism for reciprocating said first arm with respect to the second arm, mechanical means include a rack connected to each arm, and a pinion meshed with said racks.

4. Apparatus in accordance with claim 3 wherein each arm has an extension shank, each extension shank having three blade support arms generally at right angles with respect to the shank, two of the blade support arms on each shank being of the same length which is different than the length of the third blade support arm on its respective shank.

5. Apparatus in accordance with claim 3 wherein said first arm is supported at said one end above a plane containing the cutting blades, and the second arm being supported at said one end below said plane.

References Cited
UNITED STATES PATENTS

| | | | |
|---|---|---|---|
| 1,551,526 | 8/1925 | O'Neill | 65—303 |
| 2,678,518 | 5/1954 | Honiss | 83—601 |
| 3,467,514 | 9/1969 | McNamara | 65—334 |
| 1,572,143 | 2/1926 | Howard | 65—334 |
| 2,680,937 | 6/1954 | Peiler | 65—334X |
| 2,956,371 | 10/1960 | Torok | 65—334X |
| 3,435,719 | 4/1969 | Wythe | 65—133X |
| 3,490,326 | 1/1970 | McNamara | 65—334X |

FRANK W. MIGA, Primary Examiner

U.S. Cl. X.R.

65—133, 332; 83—598